(12) United States Patent
Boehl et al.

(10) Patent No.: US 9,342,096 B2
(45) Date of Patent: *May 17, 2016

(54) MODULAR STRUCTURE FOR PROCESSING DATA

(75) Inventors: Eberhard Boehl, Reutlingen (DE);
Ruben Bartholomae, Reutlingen (DE);
Stephen Schmitt, Nuertingen (DE);
Thomas Wagner, Reutlingen (DE);
Andreas Hempel, Ludwigsburg (DE);
Axel Aue, Korntal-Muenchingen (DE);
Dieter Thoss, Schwieberdingen (DE);
Thomas Lindenkreuz, Reutlingen (DE);
Achim Schaefer, Grossbottwar (DE);
Juergen Hanisch, Bempflingen (DE);
Uwe Scheurer, Reutlingen (DE);
Andreas Merker, Vaihingen/Enz (DE);
Bernd Becker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 338 days.

This patent is subject to a terminal disclaimer.

(21) Appl. No.: 13/637,061

(22) PCT Filed: Mar. 16, 2011

(86) PCT No.: PCT/EP2011/053965
§ 371 (c)(1),
(2), (4) Date: Dec. 17, 2012

(87) PCT Pub. No.: WO2011/120803
PCT Pub. Date: Oct. 6, 2011

(65) Prior Publication Data
US 2013/0227331 A1   Aug. 29, 2013

(30) Foreign Application Priority Data

Mar. 31, 2010 (DE) .......................... 10 2010 003 521

(51) Int. Cl.
G06F 1/12 (2006.01)
G06F 1/10 (2006.01)
G06F 1/14 (2006.01)

(52) U.S. Cl.
CPC ... *G06F 1/10* (2013.01); *G06F 1/14* (2013.01)

(58) Field of Classification Search
CPC ............ G06F 1/14; G06F 15/76; G05B 21/00
USPC .......................................... 713/375, 400, 600
See application file for complete search history.

(56) References Cited

U.S. PATENT DOCUMENTS 5,600,634 A    2/1997  Satoh et al.
5,774,684 A *  6/1998  Haines et al. ................. 710/305

(Continued)

FOREIGN PATENT DOCUMENTS

CN    1360396 A    7/2002
CN    1619653 A    5/2005

(Continued)

OTHER PUBLICATIONS

International Search Report corresponding to PCT Application No. PCT/EP2011/053965, mailed Oct. 17, 2011 (German and English language document) (5 pages).

*Primary Examiner* — Vincent Tran
(74) *Attorney, Agent, or Firm* — Maginot, Moore & Beck LLP

(57) ABSTRACT

A circuit arrangement for a data processing system is configured to process data in a plurality of modules. The circuit arrangement is configured such that each module is provided with at least one clock pulse, a time base and a base of at least one additional physical variable. The circuit arrangement also comprises a central routing unit to which the plurality of modules are coupled and via which the plurality of modules can periodically exchange data amongst themselves, based on the time base and/or the base of other physical variables. Each module is configured independently and parallel to other modules of the plurality of modules in order to process data. The circuit arrangement is employed in a corresponding method.

7 Claims, 1 Drawing Sheet

(56) References Cited

U.S. PATENT DOCUMENTS

| | | | |
|---|---|---|---|
| 5,959,689 A * | 9/1999 | De Lange et al. | 348/571 |
| 6,662,256 B1 * | 12/2003 | Foo | 710/305 |
| 7,219,280 B2 * | 5/2007 | McNall | 714/726 |
| 2002/0118203 A1 * | 8/2002 | Muramatsu et al. | 345/542 |
| 2006/0168314 A1 * | 7/2006 | Mujahid et al. | 709/237 |
| 2006/0247874 A1 | 11/2006 | Premerlani et al. | |
| 2008/0022140 A1 * | 1/2008 | Yamada et al. | 713/322 |
| 2008/0204074 A1 * | 8/2008 | Chan et al. | 326/41 |
| 2008/0300919 A1 * | 12/2008 | Charlton et al. | 705/2 |
| 2009/0072812 A1 * | 3/2009 | Henzler | G04F 10/005 324/76.82 |
| 2009/0282166 A1 * | 11/2009 | Athani et al. | 709/237 |
| 2010/0306433 A1 * | 12/2010 | Shimada | 710/264 |
| 2011/0145462 A1 * | 6/2011 | Mukherjee et al. | 710/269 |
| 2013/0082693 A1 * | 4/2013 | Boehl | G01B 7/30 324/207.25 |
| 2013/0111189 A1 * | 5/2013 | Boehl et al. | 712/29 |

FOREIGN PATENT DOCUMENTS

| | | |
|---|---|---|
| DE | 10 2007 044 803 A1 | 4/2009 |
| JP | 2008-113097 A | 5/2008 |
| WO | 2009/040179 A2 | 4/2009 |

\* cited by examiner

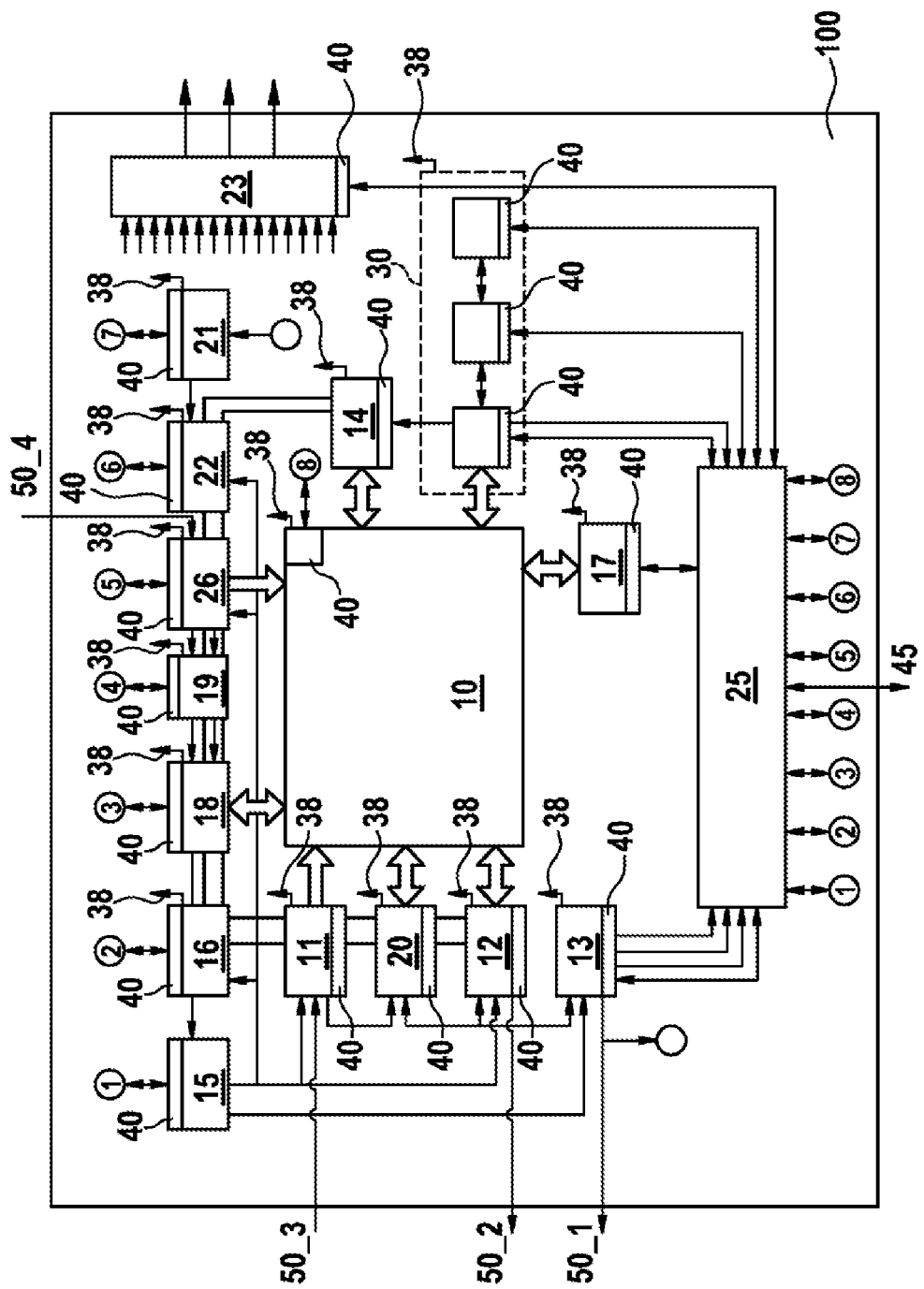

MODULAR STRUCTURE FOR PROCESSING DATA

This application is a 35 U.S.C. §371 National Stage Application of PCT/EP2011/053965, filed on Mar. 16, 2011, which claims the benefit of priority to Serial No. DE 10 2010 003 521.1, filed on Mar. 31, 2010 in Germany, the disclosures of which are incorporated herein by reference in their entirety.

The present disclosure relates to a circuit arrangement for a data processing system for processing data in a plurality of modules. The present disclosure also relates to a corresponding method for modular processing of data.

BACKGROUND

Devices known as timers, i.e. timing units, are routinely used in the prior art to support a processor, such as a CPU (Central Processing Unit) for example, for time-based and position-based processes. Such timing units can be designed as individual components or as peripheral devices to the processor, where, on the basis of one or more clocks, they time the provision of functions of varying importance for receiving and generating signals.

According to the current prior art, various architectures for implementing timing units are used in processors, such as microcontrollers, for example. There can basically be two different architecture variants here.

A first variant is a pure hardware implementation of a timing module, which must be operated and configured from a processor such as a CPU, for example. The timing module itself is then used for signal acquisition and characterization and is also capable of generating output signals of limited complexity. Such timing modules, however, are generally characterized by a high "interrupt load", because the hardware of the respective processor must be supplied with new parameters or parameters must be retrieved from the relevant hardware.

An example of an architecture of this type is the General Purpose Timer Array (GPTA) from Infinion and the Advanced Timer Unit (ATU) from Renesas™.

In contrast, a second architecture variant permits a certain degree of internal programmability of the respective timing unit. In this case, the timing unit or timing module can itself execute a program together with data, and operate input and output units accordingly. An architecture implemented in this way reduces the aforementioned interrupt load on the processor, i.e. on the central processing unit, in that many internal events of the timing unit are handled by an internal processor of the timing unit. Thus this type of architecture implements a form of small microcontroller for processing time-dependent data in the respective timing units. This implemented small microcontroller is then combined with input and output units that have a relatively low configuration. It must be mentioned here, however, that such systems are limited by interrupt latency and sequential interrupt handling, i.e. the microcontroller handles a plurality of different functions, each of which make a request to this microcontroller by interrupt, and these interrupts are processed sequentially (including the relevant delays).

The less complex variant of the aforementioned timing units is implemented, for example, by Infinion in the GPTA (General Purpose Timer Array) or by Renesas in the corresponding Advanced Timer Unit (ATU). The second, slightly more complex variant of the aforementioned timing units is implemented, for example, by Freescale™ in their Timer Processing Unit (TPU) or by Texas Instruments (TI) in their High-End Timer (HET).

In DE 10 2007 044 803, timing modules are connected together via a time routing unit TRU. These timing modules can be input and output modules in this case.

The mentioned limitations of the timing units provided in the prior art and of their respective implementation mean that it would be desirable to provide a facility not only to reduce an interrupt load on a relevant processor, which for data processing can be considered to be a central processing unit, but also to be able to handle as many processes as possible in parallel and in real time, i.e. promptly, without being restricted by an incoming number of interrupts or a number of interrupt sources.

SUMMARY

Against this background, a circuit arrangement and a corresponding method are provided.

The circuit arrangement provided according to the disclosure is implemented, for example, in a data processing architecture and reduces an incoming interrupt load for a processor, for example a CPU or ATU, available to the data processing system. Suitable embodiments of the circuit arrangement presented according to the disclosure and of the method presented according to the disclosure are disclosed below.

In one embodiment, a circuit arrangement for a data processing system is configured to process data in a plurality of modules. It is provided here that the plurality of modules are each provided with at least a clock, a time base and a base given by at least one other physical variable. The circuit arrangement comprises a routing unit, to which the plurality of modules are connected and via which the plurality of modules transfer, cyclically between one another, data that is based on the time base and/or on the base given by the other physical variable. Each of the plurality of modules is configured here to process data independently and in parallel with other modules of the plurality of modules. The cyclic data transfer is performed here either after fixed predetermined cycle times or after a maximum cycle time. It is practical in some circumstances to provide a fixed cycle time, because then a query is always made with a constant repetition rate, avoiding any fluctuation that would otherwise occur. A delay caused by data routing could be considered as a constant value. There are also cases, however, where it is advantageously intended to make use of each potential reduction in processing time, and the only restriction is not to exceed a maximum time. Then it is only necessary to ensure compliance with this maximum cycle time.

The circuit arrangement proposed according to the disclosure enables different processes to be handled in parallel, wherein the individual modules perform data processing autonomously and independently of one another. The individual modules are triggered independently by time-based and/or position-based events.

In one possible embodiment of the circuit arrangement presented according to the disclosure, the plurality of modules comprise at least an input module, an output module and a processing module. These modules for signal acquisition, signal output and processing of time-based and position-based data are connected to one another according to the disclosure via the central routing unit configured to transfer the time-based and position-based data, i.e. the routing unit is used to interconnect the modules and the signals therefrom.

In another embodiment, the circuit arrangement comprises a clock-conditioning unit, which provides configurable clocks, and a time-base unit, which contains both time-based and position-based counters and provides the current time and position information.

In another embodiment, the circuit arrangement is configured to determine the base given by the other physical variable using time-sequential input signal values of at least one input signal by determining from the sequence of sequential input signal values a time interval until a next-expected input signal value of the at least one input signal, distributing a defined number of pulses preferably evenly over the time interval, and, in counting the pulses, determining values for the other physical variable, and providing these values as the base given by the other physical variable.

In addition, in a further embodiment of the circuit arrangement, it is provided that at least some of the plurality of modules are configured for example by an external processor, such as a CPU for instance, via a suitable bus interface during a runtime of the circuit arrangement.

It is also conceivable that the central routing unit performs the function of an interrupt controller by transporting data from a source to a sink only when this data has been identified by the source as live data. The destinations, or sinks, are set up here to block access until they are supplied with new data. It is conceivable that the routing unit allows holding of the data to be transported between the modules and hence can control routing of the relevant data systematically. It is usually provided that all data sinks and data sources present are handled with the same priority. Each data sink gets assigned a period of time, and during this period of time requests data from the appropriately assigned source. The source decides whether data is available; this data is then retrieved during the available period of time.

In another embodiment of the circuit arrangement presented according to the disclosure, it is also provided that the central routing unit makes it possible to provide during data-routing the data from a source to a plurality of data sinks in one or different modules of the plurality of modules, which is equivalent to a kind of broadcasting. Blocking of the reading of data is normally provided that allows a piece of data to be read only once from a source.

The parallel mode of operation of the modules provided according to the disclosure enables a large number of requests or operations can to be handled within a short time. It is conceivable that certain modules that are not needed at that moment are switched off, making it possible to achieve a power saving in conjunction with a reduction in power consumption and temperature.

The central routing unit provided according to the disclosure also makes it possible to connect the plurality of modules to one another flexibly and also in a configurable manner. In addition, the routing unit, by blocking the requesting and sending of data, presents a new interrupt strategy for a timing module. Furthermore, providing a routing unit of this type enables interrupts to be controlled without implementing a separate interrupt controller, which saves surface area and the associated chip costs.

The disclosure also relates to a method for processing data in a plurality of modules, wherein each of the plurality of modules is provided with at least a clock, a time base and a base given by at least one other physical variable. The plurality of modules, which are based on the time base and/or on the base given by the other physical variable, transfer, cyclically between one another, data via a central routing unit, and each of the plurality of modules processes the relevant data independently and in parallel with other modules of the plurality of modules.

BRIEF DESCRIPTION OF THE DRAWINGS

Further advantages and embodiments of the disclosure are disclosed in the description and the attached drawing.

The features mentioned above and the features still to be described below can be used not only in each of the defined combinations but also in other combinations or individually, without going beyond the scope of the present disclosure.

FIG. 1 shows a block diagram of a possible embodiment of the circuit arrangement proposed according to the disclosure.

DETAILED DESCRIPTION

The disclosure is shown schematically in the drawing using embodiments and is described in diagrammatic detail with reference to the drawing. The configuration and operation is also described in detail.

The method proposed according to the disclosure and/or the circuit arrangement provided according to the disclosure can be implemented, for example, to support a processor for time-based and position-based processes in a data processing system.

FIG. 1 presents an embodiment of a circuit arrangement proposed according to the disclosure as a block diagram. The circuit arrangement 100 comprises a plurality of modules described in greater detail below. The circuit arrangement 100 comprises a central routing unit 10, which is also referred to as an ARU (Advanced Routing Unit). In addition, the circuit arrangement 100 comprises an input module 11, also referred to as a TIM (Timer Input Module), an output module 12, also referred to as an ATOM (ARU Connected Timer Output Module), a processing module 14, such as, in the case shown here, an MCS (Multi Channel Sequencer) for example, and a plurality of memory modules 30, such as a FIFO (First In, First Out) F2A and AFD, for instance. All these modules are connected to the central routing unit 10, each connection being identified by a wide double-ended arrow or a wide arrow pointing to the routing unit 10.

In the input module 11, incoming signals 50_3 are combined with time information and other physical information, and after processing and, if applicable, buffering, are used in one of the output units 12 or 13 shown here to generate output signals 50_2 and 50_3 respectively. The output unit 12 is here an output unit connected to the central routing unit 10 and also referred to here as an ATOM "ARU Connected Timer Output Module", whereas the output unit 13 constitutes an output unit or output module that is independent of the routing unit 10.

Said other physical variable is, for example, an angle of a motor, but can also represent any other physical variable, such as mass, temperature, level of a fluid, phase angle of an oscillation, a number of events (edges) or a period length or length of time of a signal for instance.

The circuit arrangement 100 shown here also comprises a clock-conditioning unit 15, which can also be referred to as a CMU (Clock Management Unit). The unit 15 provides configurable clocks. The circuit arrangement 100 also comprises a time-base unit 16, which contains both time-based and position-based counters. The time-base unit is also referred to as a TBU (Time Base Unit) and provides current time and position information, such as, for example, an item of angle information. Said individual modules, namely the input module 11, the output module 12 and the processing module 14 are supplied with the clocks and time bases, which are provided by the clock-conditioning unit 15 and the time-base unit 16 respectively, by means of the shown interconnection. The individual modules transfer data between one another via the central routing unit 10. The individual modules also contain comparators, which can be used to compare locally in the individual modules the incoming data with a current time and/or position, which ultimately results in making decisions and signaling the decision made, such as in switching an output signal, for instance.

The circuit arrangement 100 shown also comprises a branching unit 17, also referred to as a BRC (Broadcast Unit), which makes it possible during routing of data by means of the central routing unit 10 that the data from a source can be provided also to a plurality of data sinks in one or different modules, because blocking of the reading of data is normally provided that allows a piece of data to be read only once from a source.

The circuit arrangement 100 shown also comprises what is known as a DPLL (Digital Phase Locked Loop) unit 18, which can generate from position-based input signals, pulses that enable more finely divided position information in the time-base unit 16. An angle gauge, for example, can thereby display a finer resolution of an angle of rotation than corresponding input signals give. Furthermore, information about speed or rotational speed is available in the DPLL unit 18, and predictions of when a defined position will be reached can be made that also include a lead-in time. This inclusion of a lead-in time means, for example, taking into account the inertia of a control module. Input signals 50_4 for the DPLL unit 18 are usually fed via the input unit 26, wherein this is done without involving the central routing unit 10. It can also be provided that a MAP module 19 (Input Mapping Module) provided in the circuit arrangement 100 combines or selects the input signals input via the input unit 26 before they are supplied to the DPLL unit 18. It is also possible that the circuit arrangement 100 provides an SPE module 20 (Sensor Pattern Evaluation) in order to combine therein the input signals for the DPLL unit 18 appropriately for controlling, for example, electric motors (PMSM, permanent magnet synchronous motor). It is common for this purpose, for example, that a PMSM has 3 sensors, which are arranged such that the pole changeover at these sensors only ever occurs at different angle positions of the motor and thereby can never occur simultaneously. Hence it is possible to know the angle made between two pole changeovers. If the arrangement of the sensors is designed, for example, such that the motor always rotates through an identical angle between two pole changeovers at the sensors, and for each pole changeover, the relevant sensor changes its output signal, then the three sensor signals can be combined into a signal by means of an exclusive OR (EXOR) operation. Each change in the combined signal then indicates the angle completed by the motor since the last change.

In addition, the circuit arrangement 100 can provide a CMP module 21, which is used to perform a bit-wise comparison of the output signals with one another. A monitor unit 22 also provided in the circuit arrangement shown here facilitates for an external CPU (Central Processing Unit) simple monitoring of central signals for safety-critical applications, for example.

An interrupt concentrator ICM 23 (Interrupt Concentrator Module) enables interrupts (IRQ) generated by the individual modules, each of said interrupts being identified by an arrow-shaped symbol 38, to be combined into groups, and then transferred as a bundle to an external CPU. This has the advantage that the CPU does not have to handle so many interrupts.

Owing to its autonomous processing, the ARU 10 can have the effect that only a small number of interrupts or no interrupts need to be generated when a source is providing data.

In addition, a bus interface 25 is provided in the circuit arrangement 100 shown here, said interface normally being a universal handshaking interface via which all the modules of the circuit arrangement 100 can be configured by an external CPU by means of their respective AEI interfaces (Handshake Interface) contained in each module and generally denoted by reference sign 40. Data can also be transferred via the bus interface 25. For the output unit 13 (TOM) that is not connected to the routing unit 10, the appropriate outputs of the output module 13 are configured for cyclic processes, for example, by means of the bus interface 25. Arrow 45 identifies the connection to a bus or to a μC bus.

A parallel mode of operation of the modules shown means that a large number of requests can usually be handled within a relatively short time. It is conceivable that certain modules that are not needed at that moment are switched off temporarily for the purpose of saving power.

A data processing operation can be summarized and generalized as follows: an input signal is input to the signal input unit 11 and combined with time information and other physical information in the input unit 11, then is output to the routing unit 10 and routed from there to other modules, such as the processing module 14, for example, in this case an MCS, for processing there. The processed signal or processed value is then routed via the central routing unit 10 to an output unit 12.

As an additional property of the circuit-arrangement structure shown here, it must be mentioned that at least one input signal is routed via the input unit 11 directly, i.e. without interconnection of the central routing unit 10, although possibly indirectly via further processing in the MAP module 19 and/or the SPE module 20, to the digital PLL (DPLL) unit 18. This input signal routed to the DPLL unit 18 via this path can signal, for instance, that a certain angle has been completed since the last input signal, which is used by the DPLL unit 18 to make predictions on the length of time until the input of a subsequent input signal. The characteristic variable, as explained above, need not be an angle but can also be a change value of another physical variable. The DPLL unit 18 calculates from a sequence of input events the length of time that will pass until the next directly subsequent input event, which is referred to as a prediction. The DPLL unit 18 outputs over the time interval predicted in this way a defined number of pulses, and distributes this number of pulses as evenly as possible over the time interval. These pulses are counted in the time-base unit 16 and thereby, for example, an angle base is defined that is provided to all the modules.

The values that are assigned as mentioned above to an input signal are typically the value of the time base and the value of the angle base at the point in time of the input event. These values characterize the input signal and enable calculations in other modules that are connected to the central routing unit 10, such as in the processing unit 14, for example, in this case an MCS. In addition, these values can then be routed to an output unit 12 and generate output signals according to the transmitted values in conjunction with angle-base values.

Furthermore, the DPLL unit 18 can receive via the central routing unit 10, for example from the processing unit MCS 14, combined angle and time values for a future event, i.e. for example an angle value, for which the DPLL unit 18 calculates an expected time value and, if applicable, subtracts a hold-back time, in particular an inertia, and calculates therefrom a time value and angle value for a trigger event. This calculated data is then output via the central routing unit 10 to an output unit 12, which converts this trigger event at the calculated point in time or angle into a signal change at the output.

Fuel injection into an internal combustion engine is an example. This injection is intended for a certain angle of the internal combustion engine. The angle can be converted to a time if the rotational speed is known (and is as constant as possible). In addition, this must take account of an inertia of a corresponding injection valve, which produces a certain time delay before opening of the respective injection valve. Thus actuation of the injection valve must already take place by this amount of time in advance. Hence the DPLL unit 18 subtracts the time delay from the above calculated angle time and outputs the calculated value. This calculated value then produces, after routing into the output module ATOM 12, a change in output signal when the point in time concerned is reached.

Since the prediction values vary with changing rotational speed, it is useful to recalculate the prediction value with each new input value. These recalculated values replace the previous comparison values, after output from the DPLL unit 18 and routing via the ARU 10.

The routing unit 10 shown here enables flexible configuration and interconnection of the modules. In addition, the circuit arrangement 100 shown here, by the central routing unit 10 blocking the requesting and sending of data, presents a new interrupt strategy for a timing module in that it is possible to dispense with interrupts when providing data. Furthermore, the mode of operation of the central routing unit 10 enables interrupts to be controlled in a suitable way without implementing an interrupt controller, which saves surface area and hence chip costs.

In the arrangement 100 according to the disclosure there is at least one processing module (e.g. Multi Channel Sequencer, MCS) 14, and both times and angles (or other physical values) are routed via the ARU 10 together with control information.

The invention claimed is:

1. A data processing system comprising:
   a plurality of modules configured to process data independently and in parallel with other modules of the plurality of modules, the data having a time base and a base given by a first physical variable, the plurality of modules at least including:
      at least one input module configured to receive input signals and to generate the data by combining the input signals with the time base and the base given by the first physical variable;
      at least one processing module configured to receive the data and to perform an operation on the data; and
      at least one output module configured to receive processed signals and to output the processed signals;
   a phase locked loop configured to (i) determine a time interval until a next expected sensor value from a sequence of sequential sensor values, the sensor values being received from a sensor that measures the first physical variable, and (ii) distribute a defined number of pulses over the time interval;
   a time-base unit having a time-based counter and a position-based counter, the time-base unit being configured to (i) provide the time base, (ii) count the pulses from the phase locked loop, (iii) estimate values for the first physical variable at the pulses, and (iv) provide the estimated values for the first physical variable as the base given by the first physical variable; and
   a central routing unit connected to the plurality of modules, the central routing unit being configured to route the data cyclically between each module of the plurality of modules.

2. The data processing system as claimed in claim 1, further comprising:
   an interrupt concentrator configured to (i) receive interrupts generated by at least one of the plurality of modules, (ii) to combine the interrupts into groups of interrupts, and (iii) to send the groups of interrupts to an external processor.

3. The data processing system as claimed in claim 1, further comprising:
   a clock-conditioning unit configured to provide configurable clocks to the plurality of modules.

4. The data processing system as claimed in claim 1, wherein at least some of the plurality of modules are configured during a runtime of the data processing system.

5. The data processing system as claimed in claim 1, wherein the central routing unit is configured to provide during data-routing the data from a source to a plurality of data sinks in one or multiple modules of the plurality of modules.

6. A method for processing data in a plurality of modules, comprising:
   providing each module of a plurality of modules with a clock, a time base and a base given by at least one other physical variable;
   transferring data cyclically between the plurality of modules via a central routing unit, the data based on the time base and/or on the base given by the other physical variable;
   processing data in each module of the plurality of modules independently and in parallel with other modules of the plurality of modules; and
   determining the base given by the other physical variable using time-sequential input signal values of at least one input signal by:
      determining from a sequence of sequential input signal values a time interval until a next-expected input signal value of the at least one input signal;
      distributing a defined number of pulses evenly over the time interval, and, in counting the pulses, determining values for the first physical variable; and
      providing the determined values as the base given by the first physical variable.

7. The method as claimed in claim 6, further comprising:
   providing during data-routing the data from a source to a plurality of data sinks in one or multiple modules of the plurality of modules.

* * * * *